United States Patent
Juda et al.

(10) Patent No.: US 6,171,574 B1
(45) Date of Patent: Jan. 9, 2001

(54) METHOD OF LINKING MEMBRANE PURIFICATION OF HYDROGEN TO ITS GENERATION BY STEAM REFORMING OF A METHANOL-LIKE FUEL

(75) Inventors: Walter Juda, Lexington; Charles W. Krueger, Sommerville, both of MA (US)

(73) Assignee: Walter Juda Associates, Inc.

( * ) Notice: Under 35 U.S.C. 154(b), the term of this patent shall be extended for 0 days.

(21) Appl. No.: 08/719,385

(22) Filed: Sep. 24, 1996

(51) Int. Cl.[7] .............................. C01B 3/02; B01D 53/22
(52) U.S. Cl. ........................... 423/648.1; 95/56; 422/177
(58) Field of Search ............................. 423/648.1, 652; 422/177; 95/56

(56) References Cited

U.S. PATENT DOCUMENTS

| | | | |
|---|---|---|---|
| 4,810,485 | * 3/1989 | Marianowksi et al. | 423/648.1 |
| 4,981,676 | * 1/1991 | Minet et al. | 423/652 |
| 5,215,729 | * 6/1993 | Buxbaum | 423/648.1 |
| 5,229,102 | * 7/1993 | Minet et al. | 423/652 |
| 5,741,474 | * 4/1998 | Isomura et al. | 423/648.1 |

* cited by examiner

Primary Examiner—Wayne Langel
(74) Attorney, Agent, or Firm—Rines and Rines

(57) ABSTRACT

A novel method and apparatus for one-step linking of membrane permeation of hydrogen to the generation by steam reforming of a methanol-like fuel that comprises bounding a longitudinal flow path of a methanol reformate stream comprising hydrogen, steam and the oxides of carbon and methanol, by a thin palladium-bearing membrane; promoting turbulence in the flow to cause a predominant amount, but not all, of the hydrogen in the stream transversely to permeate the membrane as substantially pure hydrogen passing transversely into a region external to the bounding membrane, thereby simultaneously generating and permeating the hydrogen; and maintaining the hydrogen in the external region at least at atmospheric pressure, but at a lower pressure than the partial pressure of the residual hydrogen in the resulting depleted reformate.

13 Claims, 4 Drawing Sheets

METHOD OF LINKING MEMBRANE PURIFICATION OF HYDROGEN TO ITS GENERATION BY STEAM REFORMING OF A METHANOL-LIKE FUEL

FIELD OF THE INVENTION

The present invention relates to generating hydrogen by catalytic steam reforming of methanol and similar fuels (hereafter referred to as "methanol-like fuels", embracing methanol and carbon monoxide-containing gases, subject to the hydrogen-generating shift reaction later detailed) and purifying the hydrogen by its permeation through a selective membrane, being particularly directed to advances in linking the generation and permeation processes, utilizing preferably palladium-bearing membranes.

BACKGROUND

The demand for pure hydrogen is rapidly increasing in, for example, the electronics industry and further major growth is anticipated in the emerging market of low temperature fuel cells. Methanol, though more costly than natural gas, has a unique combination of characteristics as "hydrogen source", including easy transportation, handling, safe and low cost storage. Methanol is thus particularly suited for on-site pure hydrogen generation by catalytic steam reforming. The well known catalytic carbon monoxide shift reaction is, presumably, a step in methanol-like fuel reforming, as later described. In general, carbon monoxide, with or without admixed hydrogen, such as is produced by partial oxidation of carbon (e.g. coal) or of methane, respectively, is a similar hydrogen source; carbon monoxide, as well as methanol itself, being subject to substantially higher conversions at much lower steam reforming temperatures than natural gas and other hydrocarbons; and they lend themselves to simpler energy efficiencies.

The prior art is replete with descriptions of steam reforming of methanol on a copper-bearing catalyst at ca. 150° C.–350° C., as illustrated, for example, in three publications by J. C. Amphlett and associates, entitled "Hydrogen Production by the Catalytic Steam Reforming of Methanol Parts 1, 2 & 3" [The Canadian Journal of Chemical Engineering, 59, 720–727 (1981); 63,, 605–611 (1985); and 66, 950–956 (1988) respectively], and in two publications by R. O. Idem and N. N. Bakhshi, entitled "Production of Hydrogen from Methanol. 1. & 2." [Ind. Eng. Chem. Res. 33, 2047–2055 and 2056–2065, (1994)], incorporated herein by reference.

Generally, it is understood that methanol is first decomposed to carbon monoxide and hydrogen according to

$$CH_3OH = CO + 2H_2 \quad (1)$$

followed by the also well-known carbon monoxide "shift" reaction with steam,

$$CO + H_2O = CO_2 + H_2 \quad (2)$$

resulting in the overall equation

$$CH_3OH + H_2O = CO_2 + 3H_2 \quad (3)$$

Unavoidably, some carbon monoxide remains unreacted. The temperature is maintained between about 150° C. and 350° C. to attain reasonable kinetics and catalyst endurance. Within this range, methanol conversion increases with temperature, but so also does carbon monoxide formation, up to as high as a few percent. As shown, for example, in the R. O. Idem et al publication (page 2061), with the stoichiometric 1:1 methanol/water feed, the carbon monoxide content is between 1.2 and 1.9% (12,000 to 19,000 ppm) at 250° C. with about 74% methanol conversion depending on the particular copper catalyst. Excess steam over the stoichiometric ratio of 1:1 increases the conversion and reduces the carbon monoxide content, but adds to the vaporization heat input. The excess steam effect is illustrated in Table 1 of an article by O. A. Belsey, C. M. Seymour, R. A. J. Dams and S. C. Moore [Electrochemical Engineering and the Environment 92, Hemisphere Publishing Corporation, page 52, 1992] which shows, with a water-to-methanol ratio of about 3.6, a conversion of 94.3% and 800 ppm of carbon monoxide at the low temperatures of 230° C. at the catalyst wall and 183–195° C. across the catalyst bed, and of 99.36% conversion and 4000 ppm of carbon monoxide at the high temperature of 300° C. at the wall and 195–235° C. across the bed. Similarly, copper-based low-temperature shift catalysts, such as described in "Heterogeneous Catalysis in Practice" by C. N. Satterfield, McGraw-Hill, Inc. pages 294–295 (1980), result in similar levels of carbon monoxide. To avoid excessive sintering, the copper-based catalysts should be operated below about 325° C., and preferably below about 300° C.

The prior art is also replete with descriptions of catalytic reactions coupled with selective hydrogen permeation across, among others, palladium alloy membranes. The following discussed citations are believed to be representative of the state-of-the-art in this area.

Reference is made, for example, to "Catalysis with Permselective Inorganic Membranes", by J. N. Armor, a 25-page Review published by Elsevier Science Publishers B.V. in 1989; to an article entitled "Catalytic Palladium-based Membrane Reactors: A Review," J. Shu, B. P. A. Grandjean, A. Van Neste and S. Kaliaguine, The Canadian Journal of Chemical Engineering, 69, 1036–1059 (1991); to an article entitled "Catalytic Inorganic-Membrane Reactors: Present Experience and Future Opportunities", by G. Saracco and V. Specchia, CATAL. REV. - SCI. ENG., 36 (2), 305–384 (1994); and to yet another review entitled "Current hurdles to the success of high-temperature membrane reactors", by G. Saracco, G. F. Versteeg and W. P. M. Swaaj, J. of Membrane Science, 95, 105–123 (1994), all incorporated herein by reference. The emphasis in the above cited art has been on enhancing hydrogenation and dehydrogenation reactions.

Reference is also made to U.S. Pat. No. 4,810,485 to Marianowski et al., which describes broadly in situ hydrogen production and membrane purification, naming hydrocarbon steam reforming reactions "such as reforming of methane, propane, ethane, methanol, natural gas and refinery gas; water-gas shift reactions; and carbonaceous material gasification reactions, such as gasification of coal, peat and shale" (Col. 2, 1.60–65); and metallic membrane foils, stating that "suitable metals include palladium, nickel, cobalt, iron, ruthenium, rhodium, osmium, iridium, platinum titanium, zirconium, hafnium, vanadium, niobium, tantalum, copper , silver and gold and alloys thereof, particularly palladium, copper nickel and palladium silver alloys." (Col. 3,1.57–62). The patentees further state that "foils of copper, nickel and mixtures thereof are particularly preferred - - - ", and speculations are offered limited to high temperatures above 1000° F. or 538° C. and to membrane thicknesses of 0.0001 and 0.001 inch. There is no teaching in this patent or even a hint of the ruinous flux deterioration and the potentially catastrophic carbon monoxide poisoning described more fully hereinafter, which occur at the much lower temperatures with which the present invention is concerned and which have, surprisingly, been solved thereby. Moreover, with the exception of palladium-bearing membranes, the patentees membranes made of other metals are useless for the purposes of the present invention, including their preferred copper and nickel membranes, which are impermeable to hydrogen at the relatively low temperatures of the present invention.

As later more fully explained, the present invention is concerned with linking steam reforming of a methanol-like fuel to pure hydrogen generation by permeation through selective membranes, a concept that differs radically from mere prior art coupling hydrogenation and/or dehydrogenation with such membranes. By way of explanation, as illustrated generically in FIG. 11, page 1051 of the J. Shu et al publication, either pressurized hydrogen is permeated from the "upstream" across the membrane into the "downstream", where it hydrogenates the reactant in the presence or absence of a catalyst; or, in dehydrogenation, hydrogen is extracted upstream from the reactant, also in the presence or absence of a catalyst, and permeated to the downstream side, where it becomes merely an impurity in a sweep gas.

In neither case, however, is pure hydrogen generated downstream, at a usable (i.e. at least atmospheric) pressure, by permeation from its mixture with the much heavier carbon oxides and steam upstream; the latter interfering seriously with hydrogen permeation rates at the moderate methanol reforming temperatures, as more fully later discussed.

The J. Shu et al. article discloses also methanol reforming in conjunction with palladium alloys (Table 5, page 1046), referring to J. E. Philpott's article "Hydrogen Diffusion Technology" [Platinum Metals Review, 29, (1), 12–16 (1985)]. Philpott outlines here the commercial application of "the technology for extracting pure hydrogen from hydrogen-rich gas mixtures by diffusion - - - " through the walls of closed-end palladium/silver tubes, including the catalytic methanol/steam reaction.

Over a decade earlier, A. G. Dixon, A. C. Houston and J. K. Johnson have described "an automatic generator for the production of pure hydrogen from methanol" [Intersoc. Energy Convers. Eng. Conf., Conf. Proc. 7th, 10084–1090 (1972)]. Specifically, 1:1 molar methanol/water is fed under pressure to a catalytic reactor where the reformate is produced at a temperature between 275° C. and 325° C. In this temperature range and at moderate pressures, methanol conversion is substantial, resulting in a mixture of hydrogen and carbon dioxide close to the stoichiometric ratio of 3:1, but containing some carbon monoxide as well as some residual reactants. The reformate is then fed to a tubular palladium/silver diffusion cell wherein pure hydrogen is permeated under a hydrogen pressure gradient through its wall which is the hydrogen selective membrane. The diffusion cell is suspended integrally with the reactor "in an externally heated fluidized bed with sand as a heat transfer medium" (1st para., lines.6–8), so that reforming and permeation occur at a single temperature.

Earlier this year we have received and undated brochure by Johnson Matthey (Singapore) Pte Ltd entitled "Hydrogen Generation Systems". The brochure mentions units operated for more than 15 years and depicts the flow sheet of their commercial catalytic hydrogen generator according to which a 1:1 molar methanol/water mixture is preheated in a heat exchanger (cooling the hot pure hydrogen product), pressurized and vaporized in a heated reactor and reformed therein over a catalyst to a mixture of, mainly, hydrogen and carbon dioxide, and also containing several thousand parts per million (herein "ppm") of carbon monoxide; the reformate being then fed to a tubular diffuser containing an inner concentric also closed-end palladium/silver tube into which pure hydrogen product is permeated from the reformate with the waste gases vented.

With respect to the shift reaction (equation (2), above), reference is made to a paper entitled "The Water Gas Reaction Assisted by a Palladium Membrane Reactor" by S. Uemiya, N. Sato, H. Ando and E. Kikehi [Ind. Eng. Chem. Res., 30, 589–591 (1991)], which describes the higher carbon monoxide conversion attained by permeating the product hydrogen across the membrane and removing it downstream by means of an argon sweep gas. The membrane here was "a composite structure consisting of thin palladium film (palladium thickness 20 microns) supported on the outer surface of a porous-glass cylinder", the preparation of which was described in an earlier paper [Chem. Lett.,489–492, (1988)] by Uemiya et al.

Among typically thin palladium-bearing membranes of the prior art, reference is made to the early publication by R. Goto entitled "Hyperpure Hydrogen from Palladium Alloy Permeation (1)", Chemical Economy & Engineering Review, 2 (10) 44–50, 1970, which compares, inter alia, the "flux", "Q", i.e. the rate of hydrogen permeation from pure hydrogen upstream under pressure, through several palladium alloys (Table 1, page 46). Certain thin palladium/silver and palladium/copper alloys are disclosed, for example, in the more recent Shu et al. publication, (pages 1041–1042) and also palladium/ruthenium alloys in the Armor publication, (page 17), such being also incorporated herein by reference. A comprehensive up-to-date review of hydrogen selective palladium bearing-membranes, among others, appears in U.S. Pat. No. 5,498,278 (Mar. 12, 1996), of which, specifically, the palladium bearing metal membranes made by "coating certain less expensive transition metal alloy base metals with palladium or palladium alloys" (Col.3, lines 22–24), are also incorporated herein by reference.

The methanol-based pure hydrogen generation of the prior art, utilizing palladium bearing-membranes, however, has serious technical shortcomings, one of which is caused by the significant amounts of carbon dioxide and steam in the reformate. Specifically, we have found that hydrogen fluxes are much lower in their presence than in their absence, within the temperature range of 150° C. to 350° C.; and that the inevitable presence of carbon monoxide causes a further flux loss by poisoning palladium-bearing membranes at moderate temperatures, as carbon monoxide is preferentially adsorbed over hydrogen. This loss increases drastically with decreasing temperatures between about 300° C. to 150° C., as well as with increasing carbon monoxide concentration, resulting in carbon formation and eventually in membrane failure and/or total flux loss. In the before-described shift reaction, the much higher concentration of carbon dioxide admixed with steam causes an even more drastic aggravation of membrane poisoning.

The term "pure hydrogen flux", as used herein, is its rate of permeation in terms of volume of hydrogen per unit of membrane area per unit of time, e.g. cubic centimeters per square centimeter per minute ($cc/cm^2$-min).

The carbon monoxide poisoning effect, as a function of temperature and carbon monoxide concentration, is illustrated in Tables 1 & 2; and the aggravation due to the presence of carbon dioxide and steam is shown in Table 3.

In the Tables, there are shown the ratios of the flux, Q, of the hydrogen permeating from the reformate to the flux, Q°, permeating from pure hydrogen. The higher Q/Q°, the better the permeation, up to, at the limit, equal fluxes, or Q/Q°=1.

TABLE 1

Poisoning of a Pd/25% Ag membrane by a mixture of 98.4% hydrogen and 1.6% CO after 100 hours of operation vs. temperature.

| Temperature (° C.) | Q/Q° |
| --- | --- |
| 330 | 0.98 |
| 300 | 0.85 |
| 275 | 0.65 |
| 250 | 0.17 |
| 200 | 0.03 |
| 150 | zero |

TABLE 2

Poisoning (same membrane) by 1%, 1.6%, and 2% CO in hydrogen after one and one-half hour operation at 150° C.

| CO concentration | Q/Q° |
| --- | --- |
| 1.0% | 0.32 |
| 1.6% | 0.18 |
| 2.0% | 0.02 |

TABLE 3

Aggravation of CO-poisoning by carbon dioxide and steam, after two and one half-hours of operation at 200° C.

| gas composition (ex $H_2$) | Q/Q° |
| --- | --- |
| 2% CO | 0.4 |
| 1.6% CO + 12% $H_2O$ | 0.01 |
| 1.6% CO + 6% $CO_2$ | 0.27 |
| 1.6% CO + 22% $CO_2$ | 0.07 |

Evidently, with the palladium/silver alloy, the operating temperature must be maintained at least at about 275° C. and preferably above 300° C., to minimize or prevent carbon monoxide poisoning of the membrane.

Other alloys, while generally subject to such poisoning, differ in their resistance thereto as illustrated below. A substantially non-poisoning temperature, as defined herein, is one at which the flux loss is tolerably slow with time, without carbon formation, thus being "reversible", i.e. for example by occasional oxidation of adsorbed carbon monoxide or by temporary exposure to pure hydrogen.

In the prior art, furthermore, the hydrogen in a methanol reformate is permeated from an outer otherwise empty tube into an inner concentric, e.g. palladium/silver alloy membrane tube at a flux so inadequate as to make the process uneconomical for widespread use, and so also is the flux of the hydrogen permeated from the product of the shift reaction, herein also sometimes referred to as "shift reformate".

OBJECTS OF THE INVENTION

It is a primary object of the invention, accordingly, to provide a new and improved process and apparatus for generating hydrogen by catalytic steam reforming of methanol-like fuels and purifying the hydrogen by its permeation through a selective membrane, that shall not be subject to the drawbacks and disadvantages of the prior art techniques, as above delineated, but that, to the contrary, obviates such shortcomings through a novel linking of the generation and permeation processes, preferably utilizing palladium-bearing membrane purification.

The unexpected synergism underlying the technique of the invention that enables the attainment of this objective, resides in several discoveries apparently previously unknown in the art, as follows.

A first discovery underlying one aspect of the invention resides in unexpectedly enhancing the pure hydrogen flux across a thin palladium-bearing membrane by cross-flowing a methanol or shift reformate stream comprising hydrogen, carbon dioxide and carbon monoxide, with or without excess steam, at a controlled elevated pressure and temperature longitudinally along an open-ended straight-through tortuous path bounded by said membrane, said path being provided with what we call herein turbulence-promoting means, such as particulates, screens and non-flattened expanded metal sheets, causing a predominant amount, but not all of the hydrogen in said stream to permeate as substantially pure hydrogen transversely into an external region, and maintaining the hydrogen therein at least at atmospheric pressure, but at a lower pressure than the partial pressure of the residual hydrogen in the depleted reformate. While any unreacted methanol-like fuel can be recovered from the reformate (e.g. by condensation in the case of methanol), substantially complete (i.e. exceeding about 90%) conversion of the reactant fuel is advantageous in that it avoids the inefficiency inherent in a recovery/recycle process.

A further discovery underlying the invention resides in the finding of the importance of linking, in a single step, the methanol reforming reaction or the shift reaction with the hydrogen purification by permeation through a palladium-bearing membrane. By placing the reforming catalyst in particulate form within the path bounded by the membrane, the reformate is produced in-situ in the vicinity of the membrane under turbulence-promoting conditions, and pure hydrogen is permeated therethrough, as it is generated. Here, surprisingly, the expected increase in carbon monoxide concentration, as hydrogen is removed by permeation, (and thus membrane poisoning), is spectacularly decreased, which is a major advantage of this single step operation of the invention. For optimum membrane utilization, it is also advantageous in the single unit to initiate the reforming reaction in the feed stream prior to its entering the path bounded by the membrane, to insure the presence of some hydrogen at that entrance. At the same time, the equilibrium of the reaction of equation (3) above, is advantageously shifted by the simultaneous hydrogen generation and permeation, thereby enhancing methanol conversion, all other things being equal.

Yet another important advance that enables the achieving of the objectives of the invention is the discovery that a specific palladium/copper alloy, namely one consisting of palladium/about 40% by weight of copper, is substantially dimensionally stable and spectacularly resistant to carbon monoxide poisoning and is thus a preferred membrane herein, especially in conjunction with the simultaneous hydrogen generation and permeation. As is known, the percentage of copper in the alloy must be kept within a narrow range, plus or minus 5%, of 40% lest the intrinsic hydrogen flux drops excessively.

In the case of methanol, on the one hand, heat input is needed for the endothermic steam reforming and for the evaporation of the methanol/water feed. On the other hand, the spent reformate contains some residual hydrogen and the environmentally objectionable carbon monoxide. Still another aspect of the invention is thus to vaporize and superheat the feed by in situ heat exchange with the catalytic oxidation of the spent reformate exhaust to provide at least part, and preferably substantially all of the heat requirements.

The latter may, additionally, include also pre-heating the reactants by heat exchange with the pure hydrogen product. In the case of carbon monoxide-containing fuels undergoing the mildly exothermic shift reaction, superheating is unnecessary and in situ heat exchange with the catalytic exhaust decontamination is apt to be more than enough for heating the reactants.

It is a further object of this invention to enhance the membrane permeation of pure hydrogen by flowing a steam reformate of a methanol-like fuel through turbulence promoters in the vicinity of the palladium-bearing membrane, and to maintain the permeated hydrogen at least at atmospheric pressure.

Another object of the invention is to carry out, preferably with prior reforming initiation, methanol steam reforming and membrane purification in a single step, between about 275° C. and 325° C., with a palladium-bearing selectively hydrogen-permeable membrane, such as a suitable palladium alloy, palladium-coated transition base metal, or more particularly a palladium/35–40% cooper alloy, thereby surprisingly enhancing the permeation flux, increasing methanol conversion and avoiding carbon monoxide poisoning.

While some of the membranes of the prior art, including the above mentioned palladium-bearing base metal alloy membranes, are suitable for use in the present invention, membranes of choice are alloys of palladium and silver (ca. 25% Ag) alloy, a palladium and ruthenium (ca. 7% Ru by weight) and, especially a palladium and copper (ca. 40% by weight of Cu), as disclosed, for example, in the Shu et. al. and Armor references. By way of comparison, normalized fluxes, $Q°$, (at 250° C. and 30 psi differential hydrogen pressure) are well in excess of ten $cc/cm^2$-min., for Pd/Ag and Pd/Cu, and, depending on the Pd/Ag oxidation activation technique, can go as high as twenty five. The Pd/Cu alloy is not subject to oxygen activation, but needs a few days time in hydrogen, at an elevated temperature, to reach its steady state $Q°$ values.

It is yet another object of the invention to provide a carbon monoxide free exhaust and energy economy by in-situ heat exchange between the incoming reactants and the outgoing products.

These and other objects are hereinafter more fully described in the specification and delineated in the appended claims.

SUMMARY

In summary, from one of its important viewpoints, the invention embraces the method of producing pure hydrogen from catalytic steam reforming of a methanol-like fuel wherein a reformate stream is generated containing primarily hydrogen and carbon dioxide, as well as some carbon monoxide and some excess steam at a controlled elevated pressure and a substantially non-poisoning temperature, the steps of flowing said stream longitudinally along an open-ended straight-through tortuous path bounded by a thin palladium-bealing membrane, said path being provided with turbulence-promoters causing a predominant amount of the hydrogen in said stream, but not all, to permeate, as substantially pure hydrogen, transversely through the membrane bounding the path into an external region, and maintaining said pure hydrogen in said external region between at least atmospheric pressure and the partial pressure of the residual hydrogen in the resulting depleted reformate.

Preferred and best mode designs and apparatus are hereafter more fully described.

DRAWINGS

The invention will now be described with reference to the accompanying drawings, FIG. 1 of which is a schematic cross section of a flat sheet membrane permeator;

DESCRIPTION OF PREFERRED EMBODIMENT (S) OF INVENTION

It is now in order to describe the novel process underlying the invention in terms of experimental apparatus which has enabled us to achieve the new results of the invention.

Figure 1:
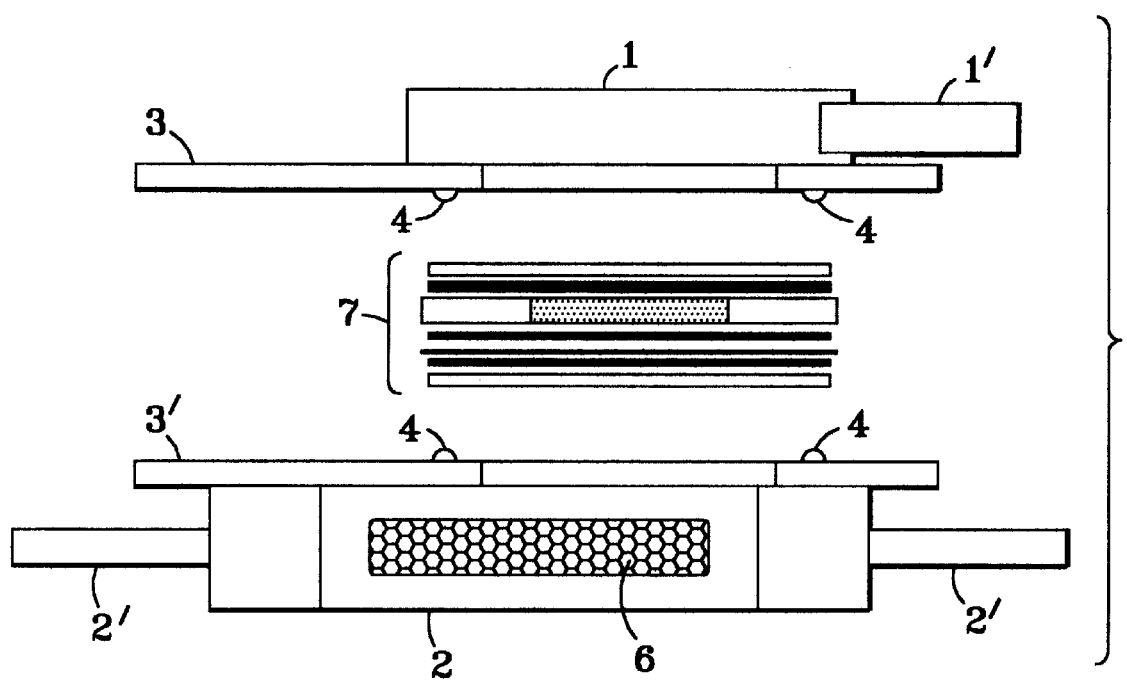

Referring to FIG. 1, by way of example of a permeator utilizing a flat membrane sheet, a hydrogen collection plenum 1 is shown formed of a preferably stainless steel open-bottom chamber (for example, ½ inch thick, ½ inch deep with a ⅛ inch wall thickness), bearing a stainless steel ¼ inch tubing 1'. The plenum 2, which contains a non-catalytic and/or catalytic turbulence promoter 6, is a stainless steel open-top chamber, having the following dimensions for the experiment here described: 3.5 inches long, 2.5 inches wide and ⅛ inch thick, and bearing ⅛ inch stainless steel inlet and outlet cross-flow tubes 2'. Chambers 1 and 2 are welded to stainless steel face plates 3 and 3', respectively, each plate being 4 inches long, 3 inches wide and ⅛ inch thick, and with knife edges 4.

Figure 2:
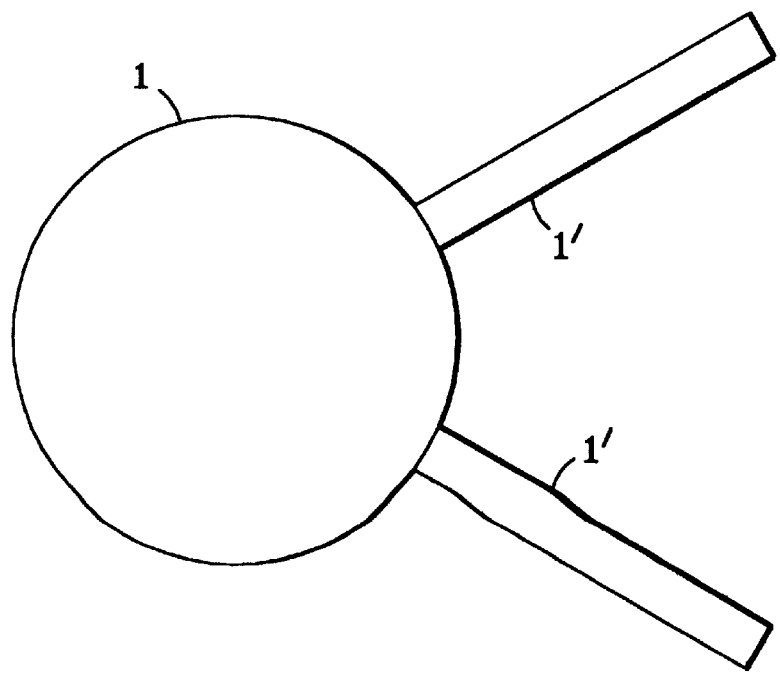
FIG. 2 is the top view of its product hydrogen plenum.
Figure 3:
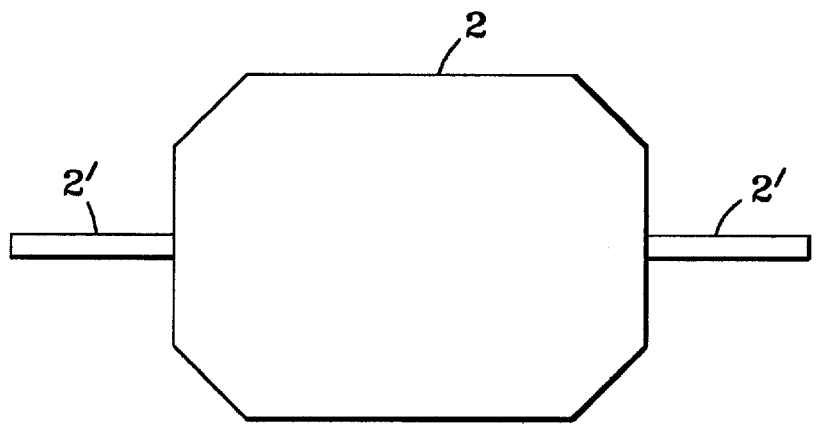
FIG. 3 is the top view of its turbulence promoters-containing plenum.

FIG. 2 also shows the plenum 1, having welded thereto, two tubes 1' (outlet and purge) arranged, for convenience, without need for cross-flow. In FIG. 3, however, the plenum 2 is provided with cross-flow inlet and outlet tubes 2' welded thereto.

Figure 4:
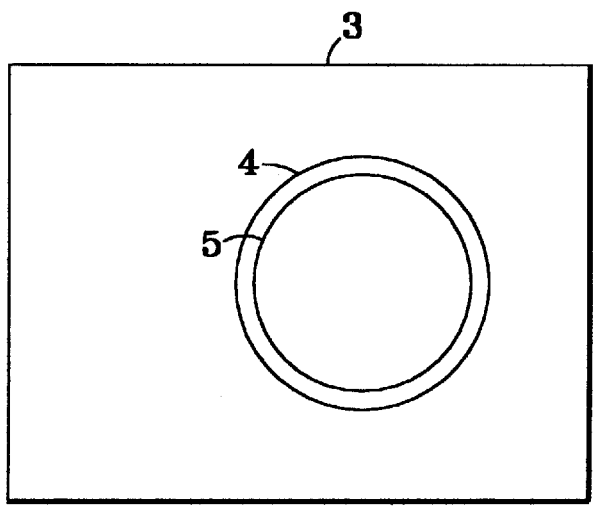
FIG. 4 is the top view of a plenum-holding plate, of which there are two.

Referring to FIG. 4, the plenum-holding plates 2 or 2' have chambers with circular openings 5, 1.5 inches in diameter, and again are provided with the knife edges 4.

Figure 5:
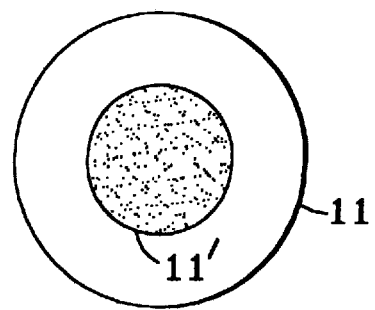
FIG. 5 is the top view of its porous membrane support at the center fitted into a non-porous rim.
Figure 6:
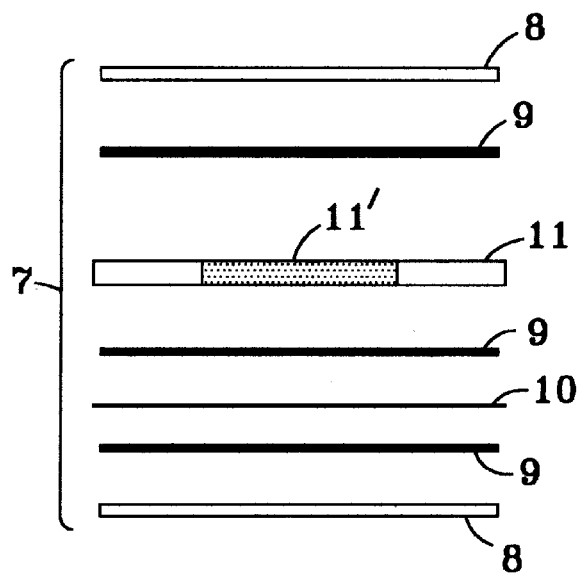
FIG. 6 is a cross section of the flat membrane pack.

FIG. 5 illustrates the membrane support which is shown as a porous stainless steel disc 11', for example, one inch in diameter and ⅛ inch thick, press-fitted into a stainless steel retainer ring 11, one inch i.d, two inches o.d. and ⅛ inch thick. The active area of the membrane is thus equal to the area of the porous disc 11', i.e. 0.785 square inches (ca. 5 $cm^2$). In FIG. 6 the cross section of the membrane pack 7 is shown, which is the center piece of the membrane permeator. The pack consists of copper gaskets 8, standard "Conflat" (Trade Mark), 1 ⁷⁄₁₆ inches i.d. and 1 ¹⁵⁄₁₆ inches o.d., Teflon gasketing ribbons 9 (sold under the Trade Name GORETEX by W. L. Gore & Associates, Inc. of Elkton, Md.), the membrane 10 and the ring 11. The membrane pack is made leak-proof by compressing it between two steel plates held in place by appropriate bolts (not shown in the figures).

EXAMPLE 1

The effect of the need of the before-described turbulence promoter in the technique of the invention, as compared with a system not using the same, will now be demonstrated.

Figure 7:
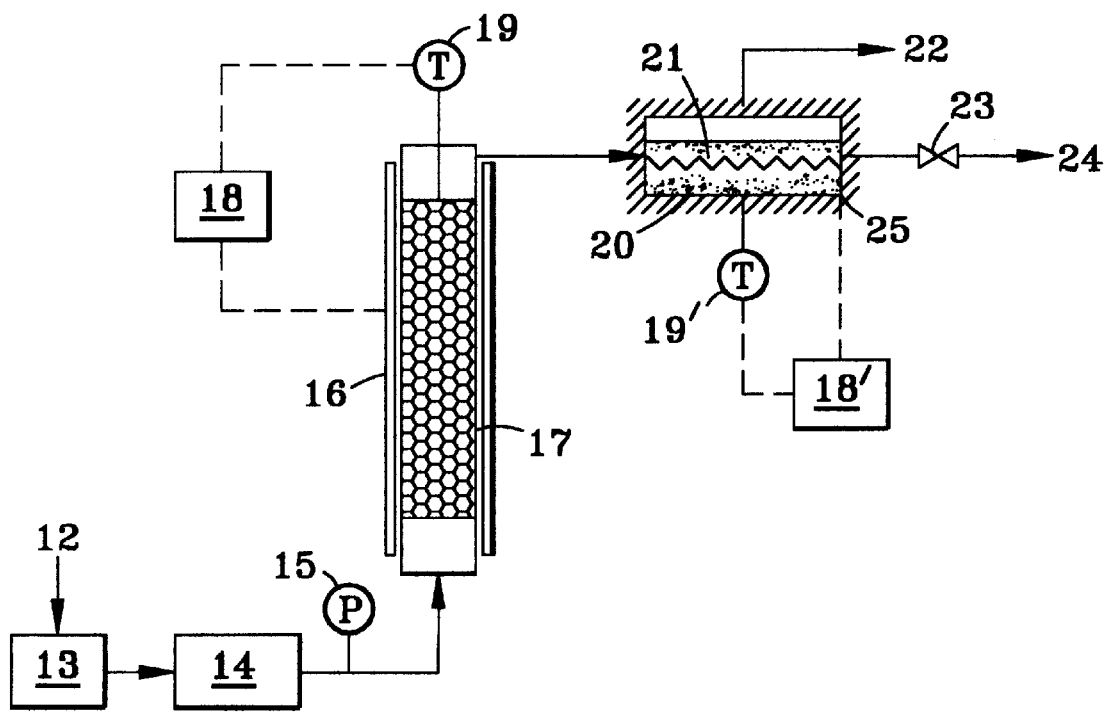
FIG. 7 is a schematic drawing of the two step process of reforming and hydrogen permeation.

In accordance with FIG. 7, a reforming process is illustrated wherein a liquid methanol/water feed 12, in the ratio of one mole of methanol and 2 mole of water, is fed by pump 13, at the rate of 0.7 cc/min, to a heat-insulated (insulation not shown) pressurized vaporizer 14 at 30–40 psi, measured by gauge 15. The vaporized mixture passes into an insulated reactor (insulation again not shown) containing a catalyst bed 17, which consists of 25 grams of a commercial methanol reforming catalyst, identified by United Catalysts Inc. of Louisville, Ky., comprising copper oxide as the active element mixed with other inorganic oxides. The catalyst bed temperature is kept at 240° C. and is measured at the top of the bed by the thermocouple 19 held constant by electronic controller 18 which powers the heating elements 16. The effluent from the catalyst bed, i.e. the reformate, is fed to the membrane permeator above-described (FIG. 1), here heat-insulated by fiber glass 25. The assembly comprises the membrane pack 7 which contains in its plenum 2, as an example of a non-catalytic turbulence promoter, about 25 grams of broken glass frits 20, about 10×10×3 mm. As shown in FIG. 7, the reformate stream flows in a tortuous path 21 through the turbulence-promoting glass frits longitudinally across the membrane 10. The membrane temperature is maintained at 320° C., measured by thermocouple 19' and held constant by controller 18' (heating elements not shown). The membrane is a 1 mil thick palladium/23% silver alloy foil separating the hydrogen product 22 from the hydrogen-depleted reformate 24, which still contains about 58% residual hydrogen, 19% $CO_2$, 2% CO and 21% $H_2O$ and is vented through valve 23. The pure hydrogen product 22 was maintained at atmospheric pressure and was generated at a flux of 8.2 cc/cm$^2$-min. under a differential hydrogen pressure of 16 psi. Its purity has been ascertained by gas chromatographic analysis showing no detectable carbon oxides.

This experiment was then repeated, except that the glass frit turbulence promoters were omitted. The same experiment was then repeated twice more, once with and once without the glass frit turbulence promoters, but replacing the reformate with a synthetic mixture of hydrogen and carbon dioxide, in the ratio of 67–68% to 33–32%, at the same feed rate.

Table 4 shows the results of these experiments in which the ratios Q/Q° are recorded versus the upstream composition. The values of Q, i.e. the pure hydrogen flux from the impure reformate or synthetic mixture, and the value of Q° (10.6 cc/cm$^2$-min.), i.e. the flux from pure hydrogen upstream, have all been obtained at the same differential hydrogen pressure across the membrane of 16 psi.

TABLE 4

Turbulence effect: steady state operation at 320° C. (same membrane), without and with glass frits promoters.

| Gas composition | Q/Q° no turbulence | Q/Q° turbulence |
|---|---|---|
| 67–68% $H_2$ + 33–32% $CO_2$ | 0.71 | 0.92 |
| Reformate | 0.32 | 0.77 |

In lieu of the glass frits as before mentioned, other turbulence promoters including metal screens and non-flattened expanded metal sheets may serve the same purpose.

The beneficial effect of introducing the turbulence is indeed spectacular. Though we do not want to be bound by any particular theory, it is plausible to attribute the benefit to the promoters producing a tortuous reformate flow, and causing the break-up of the hydrogen-depleted boundary layer of the carbon oxides and steam on the membrane surface, thereby enhancing the access of fresh hydrogen.

It is advantageous to operate the membrane permeation at a higher or the same temperature than the external reformate generation, because here the carbon monoxide concentration in the reformate is controlled and decreases with lower reforming temperatures, whereas the higher permeation temperature enhances the flux. However, as membrane temperatures increase excessively, membrane swelling due to temperature cycling, heat recovery and especially sealing become serious problems. For practical reasons we prefer to limit membrane permeation to about 325° C.

EXAMPLE 2

As an illustration of the remarkably lower carbon monoxide effect on the palladium/copper membrane compared to the palladium/25% silver membrane, a mixture of 2% CO, 25% $CO_2$ and the balance hydrogen was fed at 200° C. to the above-described membrane permeator. With the palladium/silver alloy membrane, the initial Q/Q° value was 0.3 and it dropped to about 0.17 in four and one-half hours. All other things being equal, the initial Q/Q° value for the palladium copper membrane was 0.55 and it was still about 0.52 after four and one-half hours.

While again we do not want to be held to any particular theory, it is plausible to attribute the better resistance to carbon monoxide to the copper constituent of the alloy which catalyzes the shift reaction, equation (2) discussed above, of the adsorbed carbon monoxide with steam.

Comparative tests of the above palladium/silver alloy membrane and a palladium/7% ruthenium alloy membrane, run for 140 hours at the non-poisoning temperature of 320° C. with a methanol reformate feed (produced externally at 250° C. to limit the carbon monoxide content therein) still showed a slight decline of the flux from Q=5 ½ cc/cm$^2$-min to about Q=5 for the former, whereas the Q value of the latter remained equal to 4.9 over that period. Here, all other things being equal, the palladium/ruthenium alloy membrane showed somewhat better corrosion resistance.

In comparison with palladium/silver, palladium/ruthenium, and palladium coated transition metal membranes, we have also found that the hydrogen swelling of the palladium/copper alloy membrane, and thus its dimensional change under temperature cycling, is minimal, allowing the use of flat membrane foils sealed under compression, as illustrated in the above figures. Moreover, the palladium copper alloy is activated by hydrogen without exposure to oxygen, again in contrast to the other alloys.

EXAMPLE 3

The effect of combining methanol reforming and hydrogen permeation under turbulent flow and under substantially complete fuel conversion is illustrated as follows.

Figure 8:
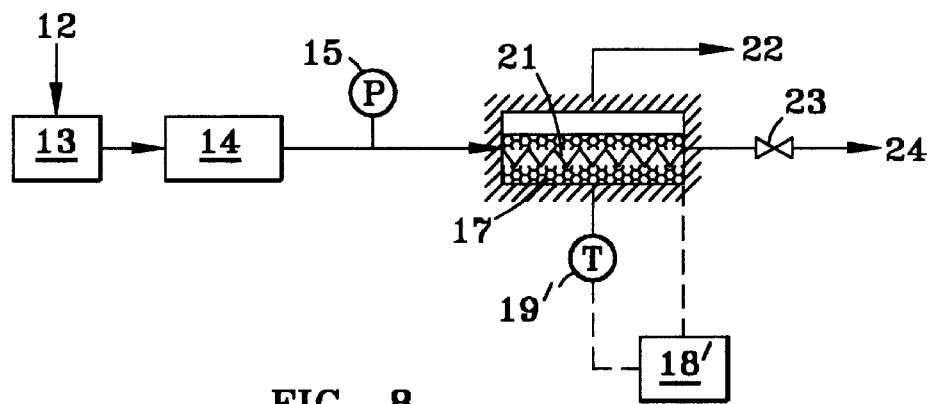
FIG. 8 is a schematic drawing or simultaneous reforming and hydrogen permeation.

As depicted in FIG. 8, the glass frits in the membrane assembly 7 above described are replaced by 12 grams of the reforming catalyst 17 in particulate cylindrical form (¼" diameter × ⅛" height) and the membrane 10 therein is now a one mil thick palladium/40% (by weight) copper alloy foil. Controller 18 holds the membrane reactor at 290° C., measured by thermocouple 19. The reactants 12, composed of 1.1 mol water and 1 mol methanol, are fed at a liquid flow rate of 0.12 ml/min. by pump 13 to the pressurized vaporizer 14 and thence to the membrane pack 7 in the assembly 20, flowing again longitudinally across the membrane in a turbulent tortuous path 21 across the granular catalyst bed. The reformate pressure, measured at gauge 15, is varied between 60 and 200 psig. The membrane assembly reactor, again heat insulated by fiber glass 25, is maintained at 290° C., measured by thermocouple 19, by controller 18. The pure hydrogen 22 is produced and maintained at atmospheric pressure. The feed pressure was varied between 60 and 200 psig. The spent permeate was vented through pressure control valve 23. The pure hydrogen product is collected at atmospheric pressure from plenum 1.

Typical results are presented in Table 5, including, as a function of total upstream pressure, the percent methanol conversion, the percentage of the reformate's hydrogen content that is permeated, i.e. the yield of pure hydrogen, and the flux.

TABLE 5

| Total Pressure (psig) | $CH_3OH$ Conversion (%) | $H_2$ Permeation (%) | Flux ($cc/cm^2$-min) |
| --- | --- | --- | --- |
| 97 | 99 | 41 | 12 |
| 108 | 99 | 47 | 14 |
| 147 | 98 | 50 | 15 |
| 180 | 93 | 57 | 16 |

In the absence of membrane permeation, at 290° C. and a pressure between one atmosphere, i.e. 0 psig, and 180 psig, methanol conversion decreases from substantially 100% to about 90%, mostly generating $CO_2$ and $H_2$ according to the reaction of previously discussed equation (3), but simultaneously generating some carbon monoxide presumably according to equation (2). It is seen that, with in situ reforming, the flux not only increases with increasing total pressures, but also causes an increase in methanol conversion by shifting the equilibrium, as hydrogen is removed as it is generated.

In an endurance test, a stable hydrogen flux range of 12 to 14 $cc/cm^2$-min. was maintained in this reactor configuration for 1000 hours at 290° C., with substantially complete methanol conversion and a pure hydrogen yield of 42 to 49%, under a differential hydrogen pressure of 65–75 psi at the outlet, and a total pressure of 100–120 psig.

The CO concentration in the spent permeate was found to be 2.5%, at the total pressure of 120 psig, that is one half the 5% CO, based on equilibrium calculations, that is expected, when the permeation is performed without the presence of the catalyst adjacent to the membrane.

The in-situ catalyst system is thus seen to perform, in addition to steam reforming, three simultaneous functions: 1) promoting turbulence, 2) enhancing methanol conversion, and 3) substantially reducing the CO concentration, the latter, presumably, by shifting the equilibrium of the catalytic water-gas reaction {equation (2) discussed above} in the vicinity of the membrane. As shown in this example, the important third function enables the safe use of a nearly stoichiometric amount of steam, e.g. only one-tenth of a mole excess steam per mole of methanol shown in this Example, without membrane poisoning.

Finally, the outstanding resistance to poisoning of the palladium/40% copper membrane was demonstrated, this time in the set-up described in example 3, by operating at 250° C. for 500 hours. The flux varied between 8 and 10 $cc/cm^2$-min. at total pressures between 100 and 130 psi without significant decrease. Here 250° C. becomes thus a significantly lower non-poisoning temperature than that of palladium/silver.

EXAMPLE 4

The use of tubular (palladium-bearing) membranes, instead of planar ones, is well known in the prior art, as shown, for instance, in the above-referred-to publication by R. Goto, includes the cell depicted in FIG. 13 (page 49) and the description of its assembly.

Figure 9:
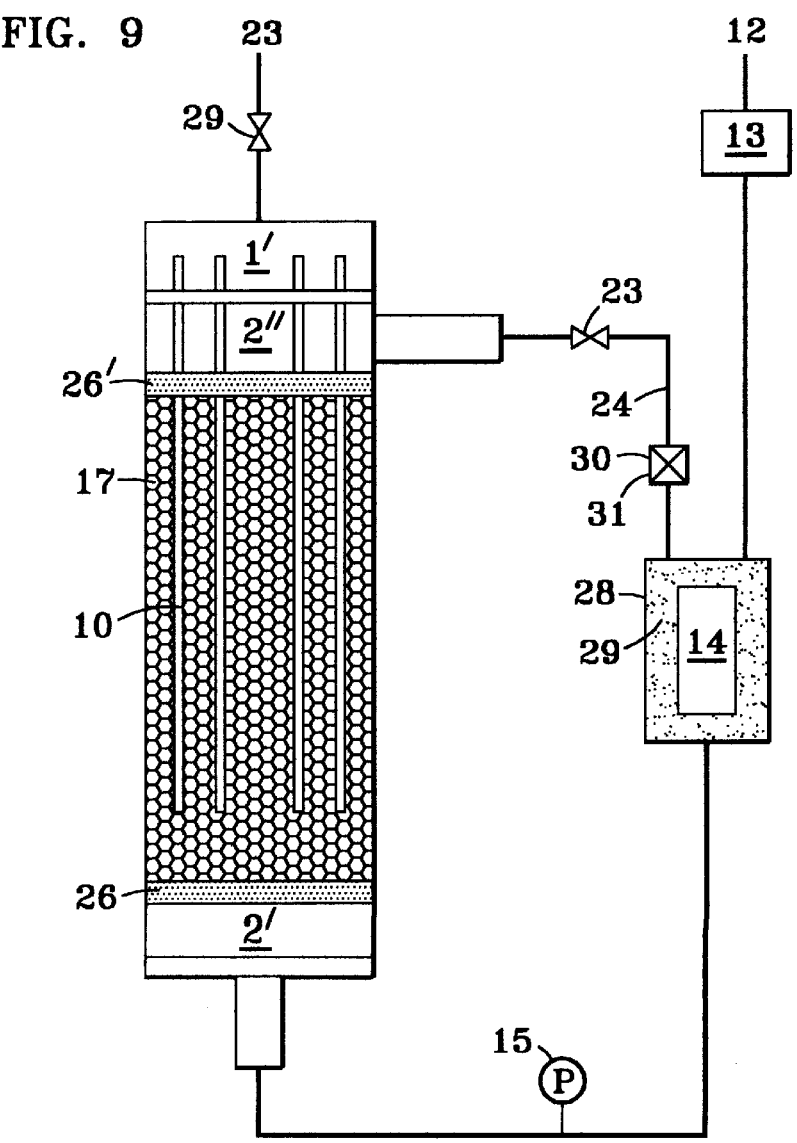
FIG. 9 is a schematic drawing of a tubular membrane assembly.

In accordance with the schematic of FIG. 9 of the present invention, Goto's cell assembly is converted to a membrane reactor of the type involved in the present invention as follows. Tubular membranes 10, e.g. the silver/palladium alloy tubes described by Goto or a palladium-coated transition base metal described in U.S. Pat. No. 5,498,278 (col. 3, line 22–24), are packed uniformly on the outside with the above referred to reforming catalyst 17, crushed and sieved to particle sizes between 10 and 20 mesh. The packed catalyst bed is held in place by uniformly porous means 26 and 26', here two 40 mesh stainless-steel screens. One, 26, is located above the bottom inlet plenum 2' of the reactants; it is not only the catalyst support, but also a flow distributor which is spaced above the inlet to plenum 2' to insure substantially equalized flow of the reactants through the catalyst bed. The other, 26', located at the top of the catalyst bed, prevents entrainment of catalyst particles by the gas flow. The membrane tubes 10 are mounted, as by brazing or welding, on a gas-impervious, e.g. stainless steel top plate 27, spaced above screen 26' at the top, which separates the outlet plenum 2" of the spent reformate from the pure hydrogen product plenum 1. The open and closed ends of the tubes are located, respectively, in plenum 1 and within the catalyst bed, preferably, spaced above the catalyst support 26, as shown in FIG. 9. This latter spacing is provided in the in-situ membrane reactor to initiate the reforming reaction before the reactants contact the membranes. Rather than initiating the reforming reaction in a separate catalytic reactor, it is indeed advantageous so to space the closed ends of the tubes that some 5–25% of the methanol is "prereformed" prior to the reactants' entry into the turbulent flow path contacting the membrane tubes. Methanol conversion is preferably carried out to substantial completion, but a controlled amount of residual hydrogen, between about 5 and 20% of the total generated, is maintained in the spent reformate at a partial pressure therein exceeding the pure hydrogen pressure down-stream.

In this manner, there is assured, in a single reactor, a differential hydrogen pressure between the reformate upstream and the pure hydrogen downstream over the entire membrane area, thereby attaining near optimum membrane utilization for the in situ hydrogen. generation and permeation.

Typically, the unit with palladium/silver alloy tubes is operated with external heating, the temperature is set at 320° C. and the total pressure is maintained at 150 psig (controls not shown in FIG. 9, except for pressure gauge 15). The reactants 12, consisting of 1.1 mol $H_2O$ to 1 mol $CH_3OH$, are fed by pump 13 to the pressurized vaporizer 14 at a liquid flow rate of 0.02 ml/min.- $cm^2$ of membrane area exposed to the reactants, the methanol conversion, with 5–15% pre-reforming, is substantially complete and 75–80% of the hydrogen generated in the reactor is permeated as the pure hydrogen product 22, at a controlled pressure of 25 psi, exiting from plenum 1 through valve 27. The spent reformate is vented from plenum 2" through control valve 23.

Similar performance is obtained with palladium-coated transition base metal tubes.

EXAMPLE 5

For wide-spread use of pure hydrogen as the non-polluting fuel, its generation from methanol must be economical. Hence energy economy is important. Moreover the by-product exhaust must be carbon monoxide-free.

The vaporization of the methanol and the water plus the endothermic steam reforming energy of methanol need substantial heat inputs which, in accordance with this invention, can advantageously be supplied by in situ heat exchange with, and exothermic catalytic oxidation of, the hot spent reformate, thereby combining energy economy and exhaust decontamination in a single step. For this purpose, as shown in FIG. 9, the pressurized vaporizer is, by way of illustration, provided with a jacket 28, which is filled with, for example, a granular platinum-bearing oxidation catalyst 29, such as any one described, by way of one example of many of the prior art, in U.S. Pat. No. 4,082,699 to Petrow et al., incorporated herein by reference.

Using the procedure of Example 4 above, the hot pressurized spent reformate 24 entrains the appropriate amount of air or oxygen 30 through Venturi valve 31 and the resulting mixture is catalytically oxidized in jacket 28 and exhausted at 29 free of carbon monoxide and of hydrogen. The amount of residual hydrogen in the spent reformate is conveniently controlled to generate sufficient heat, together with the carbon monoxide oxidation, for vaporizing and superheating the reactants to supply substantially all the energy needs. Note that the hydrogen will light off spontaneously upon contacting the oxidation catalyst and cause light off of the carbon monoxide.

The so superheated reactants exit the pressurized vaporizer 14 and are fed to plenum 2', and thence through reactor/permeator as in Example 3. Here, the space velocity of the incoming reactants, i.e. their volume per hour per unit volume of reforming catalyst, is controlled, at the operating temperature of 290° C., to cause (1) substantially complete methanol conversion, (2) 10–15% pre-reforming and (3) permeation of 75–80% of the total hydrogen generated. The exit pressure of the spent reformate is maintained at 200 psi and the pure hydrogen is produced 30 psi.

While only illustrative modes of pure hydrogen generation from methanol-like fuels have been described, modifications will occur to those skilled in the art and all such are considered to fall within the scope of the invention as defined in the appended claims.

What is claimed is:

1. The method of producing pure hydrogen comprising generating impure hydrogen by steam reforming of methanol and carbon monoxide with or without admixed hydrogen wherein a reformate stream is formed containing primarily hydrogen and carbon dioxide, as well as some carbon monoxide and some excess steam, flowing said stream at a controlled elevated pressure and at a substantially non-poisoning temperature between about 150° C. and 350° C. longitudinally along an open-ended straight-through tortuous path bounded by a thin palladium-bearing membrane, said membrane being selected from the group consisting of a palladium alloy and a palladium-coated transition base metal, and said path being provided with turbulence-promoters, causing a predominant amount of the hydrogen in said stream, but not all, to permeate as substantially pure hydrogen, transversely through the membrane bounding the path into an external region, and collecting said permeated pure hydrogen from said external region at a pressure between at least atmospheric pressure and the partial pressure of the residual hydrogen in the resulting depleted reformate.

2. The method of claim 1 wherein said turbulence is created by one or more of particulates, screens and non-flattened expanded metal sheets inserted along the path.

3. The method of claim 1 wherein the permeation temperature is maintained between about 250° C. and 325° C. and the reforming is carried out at a temperature between about 200° C. and 325° C.

4. The method of claim 1 wherein said turbulence-promoters are chemically non reactive with each of hydrogen, steam, the oxides of carbon and methanol, and the reforming and permeation are carried out at the same temperature between about 275° C. and 325° C.

5. The method of claim 1 wherein the palladium-bearing membrane is a palladium/35–45% by weight copper alloy.

6. The method of claim 1 wherein said turbulence-promoters comprise a particulate reforming catalyst within the path, wherein said permeation and said generation are caused to occur simultaneously at a substantially non-poisoning temperature to the membrane and wherein said membrane is selected from the group consisting of a palladium alloy and a palladium-coated transition base metal.

7. The method of claim 6 wherein the temperature is maintained between about 250° C. and 325° C., said membrane is a palladium/35–45% by weight copper alloy, and wherein said reforming catalyst is copper-based with at least two-thirds, but not all, of the hydrogen generation occurring simultaneously with said permeation.

8. The method of claim 1 wherein the amount of the residual hydrogen in said depleted reformate is controlled to between about 5% and 25% of the hydrogen generated, and wherein the excess steam therein is controlled to between about 5% and 20%.

9. The method of claim 1 wherein the residual hydrogen and the carbon monoxide in said depleted reformate are subjected to catalytic air or oxygen oxidation with in situ heat exchange thereby providing a carbon monoxide-free exhaust and at least part of the required process heat.

10. The method of claim 9 wherein the excess steam is controlled to a range of from about 5% to 20%.

11. A method of one-step linking of membrane purification of hydrogen to the generation at an elevated pressure and a non-poisoning temperature between about 150° C. and 350 ° C. by steam reforming of methanol and carbon monoxide with or without admixed hydrogen that comprises bounding a longitudinal flow path of a methanol reformate stream comprising hydrogen, steam and the oxides of carbon and methanol by a membrane, selected from the group consisting of a palladium alloy and a palladium-coated transition base metal, promoting turbulence in the flow to cause a predominant amount, but not all, of the hydrogen in the stream transversely to permeate the membrane as substantially pure hydrogen passing transversely into a region external to the bounding membrane, thereby simultaneously generating and permeating the hydrogen; and collecting the permeated pure hydrogen from the external region at a pressure of at least atmospheric pressure, but at a lower pressure than the partial pressure of the residual hydrogen in the resulting depleted reformate.

12. A method as claimed in claim 11 and in which the permeation temperature is maintained between about 250° C. and 325° C. and the reforming is carried out at a temperature between about 200° C. and 325° C.

13. A method as claimed in claim 12 and in which the reforming and permeation are carried out at substantially the same temperature lying within about 150° and 350°.

* * * * *